(12) United States Patent
Call

(10) Patent No.: US 9,112,214 B2
(45) Date of Patent: Aug. 18, 2015

(54) BATTERY SEPARATOR AND METHOD OF MAKING SAME

(75) Inventor: Ronald W. Call, Rock Hill, SC (US)

(73) Assignee: Celgard Inc., Charlotte, NC (US)

( * ) Notice: Subject to any disclaimer, the term of this patent is extended or adjusted under 35 U.S.C. 154(b) by 128 days.

(21) Appl. No.: 11/683,022

(22) Filed: Mar. 7, 2007

(65) Prior Publication Data

US 2007/0148538 A1 Jun. 28, 2007

Related U.S. Application Data

(62) Division of application No. 10/636,115, filed on Aug. 7, 2003, now abandoned.

(51) Int. Cl.
*H01M 2/16* (2006.01)
*B32B 27/32* (2006.01)

(52) U.S. Cl.
CPC .......... *H01M 2/1686* (2013.01); *H01M 2/1653* (2013.01); *B32B 27/32* (2013.01)

(58) Field of Classification Search
CPC ... H01M 2/1653; H01M 2/1686; B32B 27/32
USPC .................. 429/144; 156/244.11, 244.27, 324
See application file for complete search history.

(56) References Cited

U.S. PATENT DOCUMENTS

| | | | |
|---|---|---|---|
| 5,480,745 A | 1/1996 | Nishiyama et al. | |
| 5,667,911 A * | 9/1997 | Yu et al. | 429/144 |
| 5,691,047 A * | 11/1997 | Kurauchi et al. | 428/315.7 |
| 5,691,077 A * | 11/1997 | Yu | 429/62 |
| 5,952,120 A | 9/1999 | Yu et al. | |
| 6,379,605 B1 * | 4/2002 | Lin | 264/414 |
| 6,521,555 B1 * | 2/2003 | Bodaghi et al. | 442/400 |
| 6,602,593 B1 * | 8/2003 | Callahan et al. | 428/316.6 |
| 6,833,219 B2 | 12/2004 | Lee et al. | |
| 2002/0104608 A1 * | 8/2002 | Welch et al. | 156/176 |
| 2002/0136945 A1 | 9/2002 | Call et al. | |
| 2003/0136500 A1 * | 7/2003 | Yu | 156/229 |
| 2004/0005428 A1 * | 1/2004 | Katoh et al. | 428/42.3 |
| 2004/0005834 A1 * | 1/2004 | Zhou et al. | 442/328 |
| 2004/0087235 A1 * | 5/2004 | Morman et al. | 442/394 |

FOREIGN PATENT DOCUMENTS

JP 10-237202 9/1998

* cited by examiner

*Primary Examiner* — Milton I Cano
*Assistant Examiner* — Stephen Yanchuk
(74) *Attorney, Agent, or Firm* — Hammer & Associates, P.C.

(57) ABSTRACT

A battery separator comprises a multi-layered film, individual layers of film having been bonded together by heat and pressure, having a peel strength of greater than or equal to 40 grams per inch (1.6 g/mm) and a thickness of ≤25 microns. A method for making a battery separator comprises the steps of: extruding and winding up a first precursor film, extruding and winding up a second precursor film, unwinding the first and second precursor films, stacking up the first and second precursor films to form a single stacked precursor, laminating the single stacked precursor film, winding up the laminated single stacked precursor film, stacking up a plurality of laminated single stacked precursor films, and making microporous the stacked plurality of laminated single stacked precursor films.

23 Claims, No Drawings

BATTERY SEPARATOR AND METHOD OF MAKING SAME

RELATED APPLICATION

The instant application is a divisional application claiming the benefit of U.S. application Ser. No. 10/636,115 filed Aug. 7, 2003, now abandoned.

FIELD OF THE INVENTION

A microporous laminated membrane useful as a battery separator, particularly in lithium secondary batteries, and its method of manufacture are disclosed herein.

BACKGROUND OF THE INVENTION

The use of microporous multi-layered membranes as battery separators is known. See, for example, U.S. Pat. Nos. 5,480,745; 5,691,047; 5,667,911; 5,691,077; and 5,952,120.

U.S. Pat. No. 5,480,745 discloses forming the multi-layered film by co-extruding the multi-layered precursor or by heat-welding, at 152° C., pre-formed precursor layers. The multi-layered precursor, formed by either technique, is then made microporous by annealing and stretching. There is no mention of stacking precursors for the step of forming the micropores.

U.S. Pat. No. 5,691,047 discloses forming the multi-layered film by co-extruding the multi-layered precursor or by uniting, under heat (120-140° C.) and pressure (1-3 kg/cm2), three or more precursor layers. The precursor formed under heat and pressure, at a speed of 0.5 to 8 m/min (1.6-26.2 ft/min), has a peel strength in the range of 3 to 60 g/15 mm (0.2-4 g/mm). In the examples, one 34 μ separator has a peel strength of 1 g/mm and the other, about 0.5 g/mm. The multi-layered precursor, formed by either technique, is then made microporous by annealing and stretching. There is no mention of stacking precursors for the step of forming the micropores.

U.S. Pat. No. 5,667,911 discloses forming the multi-layered film by uniting (by heat and pressure or by adhesives) cross-plied microporous films to form a multi-layered microporous film. The microporous films are laminated together using heat (110° C.-140° C.) and pressure (300-450 psi) and at line speeds of 15-50 ft/min (4.6-15.2 m/min).

U.S. Pat. No. 5,691,077 discloses forming the multi-layered film by uniting, by heat and pressure (calendering), or by adhesives, or by pattern welding, microporous films to form a multi-layered microporous film. Calendering is performed at 125° C. to 130° C. for a residence time of 2 to 10 minutes. Four (4) stacked multi-layered microporous precursors are calendering between a single nip roll.

U.S. Pat. No. 5,952,120 discloses forming the multi-layered film by extruding nonporous precursors, bonding together nonporous precursors, annealing the bonded, nonporous precursors, and stretching the bonded, nonporous precursors to form a multi-layered microporous film. At least four (4) tri-layer precursors are simultaneously passed through the steps of bonding, annealing, and stretching. Bonding was performed between nip rollers at 128° C. (range 125° C.-135° C.) at a line speed of 30 ft/min (9.1 m/min) to yield a peel strength of 5.7 g/in (0.2 g/mm) and between nip rollers at 128° C.-130° C. at a line speed of 40 ft/min (12.2 m/min) to yield a peel strength of 30 g/in (1.2 g/mm).

While the foregoing processes have produced commercially viable multi-layered, microporous films suitable for use as battery separators, there is a desire on the part of both the separator manufacturers and the battery manufacturers to have such films with greater interply adhesion (i.e., resistance to peeling individual layers from one another, measured by peel strength). One route, mentioned above, is to co-extrude the multi-layered film. From co-extrusion, an infinite peel strength may be obtained because the polymers at the interface of the layers are knitted together during extrusion. However, when individual layers are extruded and subsequently bonded (or laminated) together, peel strengths have been limited (as noted above).

Accordingly, there is a need to improve the peel strength of multi-layered microporous films made by laminating together precursors.

SUMMARY OF THE INVENTION

A battery separator comprises a multi-layered film, individual layers of said film having been bonded together by heat and pressure, having a peel strength of greater than or equal to 40 grams per inch (1.6 g/mm) and a thickness of ≤25 microns. A method for making a battery separator comprises the steps of: extruding and winding up a first precursor film, extruding and winding up a second precursor film, unwinding the first and second precursor films, stacking up the first and second precursor films to form a single stacked precursor, laminating the single stacked precursor film, winding up the laminated single stacked precursor film, stacking up a plurality of laminated single stacked precursor films, and making microporous the stacked plurality of laminated single stacked precursor films.

DETAILED DESCRIPTION OF THE INVENTION

A battery separator refers to a microporous film or membrane for use in electrochemical cells or capacitors. Electrochemical cells include primary (non-rechargeable) and secondary (rechargeable) batteries, such as batteries based on lithium chemistry. These films are commonly made of polyolefins, for example, polyethylene, polypropylene, polybutylene, polymethylpentene, mixtures thereof and copolymers thereof. Polypropylene (including isotactic and atactic) and polyethylene (including LDPE, LLDPE, HDPE, and UHMWPE) and blends thereof and their copolymers are the preferred polyolefins that are used to make commercially available films for these applications. These films may be made by the CELGARD® process (also known as the dry process, i.e., extrude-anneal-stretch) or by a solvent extraction process (also known as the wet process or phase inversion process or TIPS, thermally induced phase separation, process) or by a particle stretch process. Some of these films, those made by the dry process, are often multi-layered films. Multi-layered films are preferred because they have shutdown capability (i.e., can stop the flow of ions in the event of short circuiting). A common multi-layered film is the tri-layered film. A popular tri-layered film has a polypropylene (PP)/polyethylene (PE)/polypropylene (PP) structure, another structure is PE/PP/PE. Another separator is a 5-layered film with a PP/PE/PP/PE/PP or a PE/PP/PE/PP/PE structure. Such separators have a thickness less than 3 mils (75 microns, μ). Preferably, the thickness ranges from 0.5 to 1.5 mils (12 to 38 μ) (thickness is the average of 30 measurements across the width of the film, using a precision micrometer with a 0.25-inch diameter circular shoe contacting the sample at eight (8) psi). Most preferably, the thickness ranges from 0.5 to 1.0 mils (12 to 25 μ). Adhesion (interply adhesion, measured by peel strength—using a Chatillon TCD-20 Peel force Tester, Digital Gram Gauge Model DFG-2, and GF6 cam type Grips, sample—1 inch (2.54 cm)×6-8 inch (15.24-20.32 cm), peel back 1 inch (2.54 cm) of outside layers from the middle layer with transparent tape and place one outside layer and middle layer in grips) is greater than 40 grams/inch (1.6 g/mm), preferably greater than 50 g/in (2.0 g/mm), and most preferably greater than 60 g/in (2.4 g/mm). Other film properties are: Gurley <30 seconds (Gurley—ASTM-D726(B)—a resistance to air flow measured by the Gurley Densometer (e.g. Model 4120), the time (sec) required to pass 10 cc of air through one square inch of product under a pressure of 12.2 inches of water, 10 samples are averaged). Basis weight ranging from 0.5-2.0 mg/cm² (basis weight is the average of 3—one foot square samples from across the width of the sample weighted on a precision balance with an accuracy of 0.0001 grams). Shrinkage (%) is less than or equal to 5.0% (shrinkage is the average of three 10 cm samples from across the width of the film, they are measured, exposed to 90° C. air for 60 minutes and re-measured, the average is reported. Puncture strength≥360 grams (puncture strength is the average of ten measurements made from across the width of the sample. A Mitech Stevens LFRA Texture Analyzer is used. The needle is 1.65 mm in diameter with a 0.5 mm radius. The rate of descent is 2 mm/sec and the amount of deflection is 6 mm. The film is held tight in the clamping device with a central hole of 11.3 mm. The maximum resistance force is the puncture strength.) The pore size is about 0.04×0.09 µ. The calculated porosity is less than 60%, preferably about 40%. The calculated density is 100—(apparent density/resin density) and for multi-layered films, calculated porosity is 100— ρ(apparent density/resin density)>.

In the manufacture of these films, the process generally comprises: extruding nonporous precursors; bonding together the nonporous precursors; and making microporous the bonded nonporous precursors. For example, in a wet process, a mixture of matrix components and extractable components are extruded to form a nonporous precursor film. Precursor films are stacked for bonding, the stacking being in the configuration of the desired end product. The stacked precursor films are then bonded. Thereafter, the bonded stacked precursor films are made microporous by subjecting that film to an extraction bath where solvents would be used to remove the extractable components from matrix components. In the dry process, on the other hand, the matrix components are extruded to form a nonporous precursor film. Precursor films are stacked for bonding, the stacking being in the configuration of the desired end product. The stacked precursor films are then bonded. Thereafter, the bonded stacked precursor films are made microporous by subjecting that film to an annealing and then stretching steps where stretching induces pore formation at the interface of crystalline and amphorous regions in the matrix components. The invention will be further described with reference to the dry process.

Extruding the precursor film is conventional. For example, see U.S. Pat. Nos. 5,480,945; 5,691,047; 5,667,911; 5,691,077; 5,952,120; and 6,602,593. Matrix components are polyolefins. The polyolefins are preferably any polyolefin suitable for blown film or slot die film productions. Most preferred are polyethylene and polypropylenes suitable for blown film or slot die film production. Nonporous precursor films are extruded and wound up. For example, in a blown film process, a tubular parison is extruded, collapsed, and the wound up and in a slot die or T die process, the flat parison is extruded and wound up. Each of these nonporous precursor films will become a layer of the multi-layered microporous membrane.

Laminating (e.g., bonding with heat and pressure via nip rollers) of two or more of the nonporous precursor films is performed next. The nonporous precursor films are unwound and stacked in a conventional manner before bonding in a laminator. The unwinding and stacking may be performed as illustrated in U.S. Pat. Nos. 5,691,077 and 5,952,120, except only one set of stacked nonporous precursor films (i.e., a set being a stack of precursor films laid up in the configuration of the desired final microporous membrane) is run through the heated nip rolls of the precursor at a time. A preferred configuration is a tri-layer precursor with a PP/PE/PP lay-up pattern. It is preferred that the higher melting point material (e.g., PP in a PP/PE/PP) precursor be wider than the lower melting point material (e.g., PE in a PP/PE/PP) so to prevent sticking on the heated nip rolls. Line speeds through the heated nip rolls are greater than 50 feet per minute (15.2 m/min) and typically range from 50-200 fpm (15.2-61 m/min). Preferably, the line speeds are greater than 100 fpm (30.5 m/min), more preferably 125 fpm (38.1 m/min), and most preferably, 150 fpm (45.7 m/min). The heated nip roll temperature ranges from 100-175° C., preferably 145 to 170° C., and most preferably 155-1650C. Nip roll pressure ranges from 100 to 800 pounds per linear inch (pli) (17.7-141.7 kg per linear cm), preferably 100 to 300 pli (17.7-53.1 kg per linear cm).

After the now bonded stacked nonporous precursor, which is heated for bonding, is wound up. Prior to wind up, however, it is desirable to cool the film. This cooling is preferably accomplished by the use of a chill roll. The chill roll temperatures may range from 20-45° C., preferably 25-40° C. It is most preferred that this film be below the glass transition temperature (Tg) of the outer most layer prior to contact with the chill roll, this prevents the film from sticking to the chill roll. To assist cooling and uniformity of cooling across the width of the film, an air knife may be employed between the heat nip rollers and the chill roll. Finally, the bonded, nonporous stacked precursor may curl along the lateral edges of the film. If so, trim knives may be used to remove the curl prior to winding. Two sets of stacked nonporous precursor films may be simultaneously wound onto a single roll.

Thereafter, the bonded, stacked precursor film is ready to made microporous. A plurality of the bonded stacked precursor films are stacked. At least four (4) bonded stacked precursor films are stacked for further processing, preferably at least six (6), most preferably at least twelve (12), and still more preferably at least sixteen (16) may be stacked for further processing. The plurality of bonded stacked precursor films are then simultaneously annealed and then stretched in a conventional manner. For example, see: U.S. Pat. Nos. 5,480, 945; 5,691,047; 5,667,911; 5,691,077; 5,952,120; and 6,602, 593 for typical annealing and stretching conditions.

The foregoing invention will be further illustrated by way of the following examples:

In the following examples, the films were made by identical processes except Examples 1 and 3 were bonded together by the inventive process and Comparative Examples 2 and 4 were prepared according to the process set out in U.S. Pat. No. 5,952,120. Lamination parameters fro the inventive process are as set forth above, reference preferred ranges. Example 1 and Comparative Example 2 have a nominal thickness of 25 µ, and Example 3 and Comparative Example 4 have a nominal thickness of 20 µ.

|  | EX 1 | CEX 2 | EX 3 | CEX 4 |
| --- | --- | --- | --- | --- |
| Gurley | 25.0 | 22.9 | 18.8 | 18.5 |
| Thickness | 26.5 | 25.0 | 20.7 | 20.2 |
| Basis Weight | 1.5 | 1.4 | 1.1 | 1.1 |

-continued

|  | EX 1 | CEX 2 | EX 3 | CEX 4 |
|---|---|---|---|---|
| Shrinkage % | 2.5 | 2.2 | 1.7 | 1.6 |
| Adhesion | 63.1 | 37.8 | 62.2 | 39.6 |
| Porosity % | 38.7 | 39.8 | 42.2 | 45.5 |
| Puncture Strength | 471 | 476 | 423 | 446 |
| MD Strength (Kg/cm$^2$) | 1521 | 1996 | 1977 | 1997 |
| MD % Elongation | 46 | 46 | 43 | 41 |
| TD Strength (Kg/cm$^2$) | 157 | 139 | 157 | 145 |
| TD % Elongation | 151 | 555 | 931 | 788 |
| Electrical Resistance (ER) | 8.3 | 7.6 | 7.4 | 7.7 |

Tensile properties (TD & MD strength and TD & MD % Elongation) were measured using an INSTRON MODEL 4201 (with Series IX Automated Materials Testing Software for Windows), crosshead speed 508.00 mm/min, samples 5½ inch (1.27 cm)×6-8 inches (15.24-20.32 cm), clamp pressure −90 psi (6.33 Kg/cm$^2$) Electrical Resistance (ER) is reported as MacMullen Number ($N_{mac} = r_{separator}/\eta_{electrolyte} t_{separator}$, $r_{separator}$=R(measured resistance of separator)$A_{probe}$ (area of probe, cm$^2$), $\eta_{electrolyte}$=electrolyte resistivity (ohm-cm), $t_{separator}$=separator thickness (cm)) using an EG&G Princeton Applied Research of Oak Ridge, Tenn., 273A Potentiostat with 5210 Lock-in Amplifier and the PowerSuite software. The test cell has a 1 square inch (6.45 square cm) electrode faces that contact the wetted separator. Separators are wetted with a 1 molar LiPF$_6$ electrolyte in a 3:7 weight ratio ethyl carbonate (EC) to ethyl methyl carbonate (EMC). Measurements are taken at AC amplitude of 5 mV and a frequency range of 22,000 to 24,000 Hz. The report results are the average of four membranes, 4 membranes are stacked and measured, them remove one membrane and measure 3 membranes and so forth, the differences are averaged and reported.

The present invention may be embodied in other forms without departing from the spirit and the essential attributes thereof, and, accordingly, reference should be made to the appended claims, rather than to the foregoing specification, as indicated the scope of the invention.

That which is claimed:

1. A method of making a battery separator for a lithium battery, the battery separator being a multi-layered microporous film, individual layers of said film having been bonded together by heat and pressure, having a peel strength of greater than 60 grams per inch (2.4 g/mm) and a thickness of ≤25 microns, comprising the steps of:
   extruding and winding up a first precursor film;
   extruding and winding up a second precursor film;
   unwinding the first and second precursor film;
   stacking up the first and second precursor films to form a single, nonporous stacked precursor film;
   laminating only the single stacked precursor film at speeds greater than 125 ft/min (38.1 m/min) between heated nip rollers having a temperature ranging from 145° C. to 170° C. thereby bonding the stacked first and second precursor films to one another;
   cooling the laminated, single nonporous stacked precursor film;
   winding up the laminated, single nonporous stacked precursor film;
   stacking up a plurality of laminated, single nonporous stacked precursor films; and
   making microporous said stack of plurality of laminated single stacked precursor films.

2. The method of claim 1 wherein extruding the first or second precursor further comprises extruding with a slot die, T die, or a blown film die.

3. The method of claim 1 wherein the single stacked precursor film being a tri-layer precursor.

4. The method of claim 3 wherein the tri-layer precursor being a polypropylene-polyethylene-polypropylene precursor.

5. The method of claim 1 wherein laminating being at speeds greater than 150 ft/min (45.7 m/min).

6. The method of claim 5 wherein laminating being at speeds greater than 200 ft/min (61.0 m/min).

7. The method of claim 1 wherein the nip roller temperature ranges from 155° C. to 165° C.

8. The method of claim 1 wherein the nip roller pressure ranges from 100 to 800 pounds per linear inch (pli).

9. The method of claim 8 wherein the nip roller pressure ranges from 100 to 300 pli.

10. The method of claim 1 wherein cooling the laminated, single nonporous stacked precursor film involves a chill roll following the nip rollers.

11. The method of claim 10 wherein the chill roll temperature ranges from 20° C. to 45° C.

12. The method of claim 11 wherein the chill roll temperature ranges from 25° C. to 40° C.

13. The method of claim 10 wherein an air knife being placed between the nip rollers and the chill roll.

14. The method of claim 10 wherein edge trim knives follow the chill roll.

15. The method of claim 1 wherein the plurality of laminated single stacked nonporous precursor films being at least six laminated single stacked precursor films.

16. The method of claim 15 wherein the plurality of laminated single stacked nonporous precursor films being at least twelve laminated single stacked precursor films.

17. The method of claim 16 wherein the plurality of laminated single stacked nonporous precursor films being at least sixteen laminated single stacked precursor films.

18. The method of claim 1 wherein making microporous said stack of plurality of laminated single stacked precursor films being selected from the group consisting of a dry process and a wet process.

19. The method of claim 1 wherein the stack of plurality of laminated single stacked precursor films being at least four laminated single stacked precursor films.

20. A method of making a battery separator for a lithium battery, the battery separator being a tri-layered microporous film, individual layers of said film having been bonded together by heat and pressure, having a peel strength of greater than 60 grams per inch (2.4g/mm) and a thickness of ≤25 microns, comprising the steps of:
   extruding and winding up a first precursor film;
   extruding and winding up a second precursor film;
   extruding and winding up a third precursor film;
   unwinding the first, second and third precursor films;
   stacking up the first, second and third precursor films to form a single, nonporous stacked precursor film;
   laminating only the single nonporous stacked precursor film at speeds greater than 125 ft/min (38.1 m/min) between heated nip rollers having a temperature ranging from 145° C. to 170° C. thereby bonding the first, second and third precursor films to one another;
   cooling the laminated, single nonporous stacked precursor film;

winding up the laminated, single nonporous precursor film;

stacking up a plurality of laminated, nonporous single stacked precursor films; and making microporous said stack of a plurality of laminated single stacked precursor films.

21. The method of claim 1 wherein the single, nonporous stacked precursor film has a basis weight in the range of 0.5-2.0 mg/cm$^2$.

22. The method of claim 20 wherein the single, nonporous stacked precursor film has a basis weight in the range of 0.5-2.0 mg/cm$^2$.

23. A method of making a batter separator for a lithium batter, the batter separator being a multi-layered microporous film, individual layers of said film having been bonded together by heat and pressure, having a peel strength of greater than 60 grams per inch (2.4 g/mm) and a thickness of ≤25 microns, comprising the steps of:

extruding and winding up a first precursor film;

extruding and winding up a second precursor film;

unwinding the first and second precursor films;

stacking up the first and second precursor films to form a single, nonporous stacked precursor film;

laminating only the single stacked precursor film at speeds greater than 125 ft/min (38.1 m/min) between heated nip rollers having a temperature ranging from 145° C. to 170° C. thereby bonding the stacked first and second precursor films to one another;

stacking up a plurality of laminated, single nonporous stackd precursor films; and making microporous said stack of plurality of laminated single stacked precursor films.

\* \* \* \* \*

UNITED STATES PATENT AND TRADEMARK OFFICE
CERTIFICATE OF CORRECTION

| | | |
|---|---|---|
| PATENT NO. | : 9,112,214 B2 | |
| APPLICATION NO. | : 11/683022 | |
| DATED | : August 18, 2015 | |
| INVENTOR(S) | : Ronald W. Call | |

It is certified that error appears in the above-identified patent and that said Letters Patent is hereby corrected as shown below:

In the claims

In Col. 7, line 13, replace "batter" with "battery."

In Col. 7, line 14, replace both occurrences, "batter" with "battery."

Signed and Sealed this
Ninth Day of August, 2016

Michelle K. Lee
*Director of the United States Patent and Trademark Office*